Figure 1:
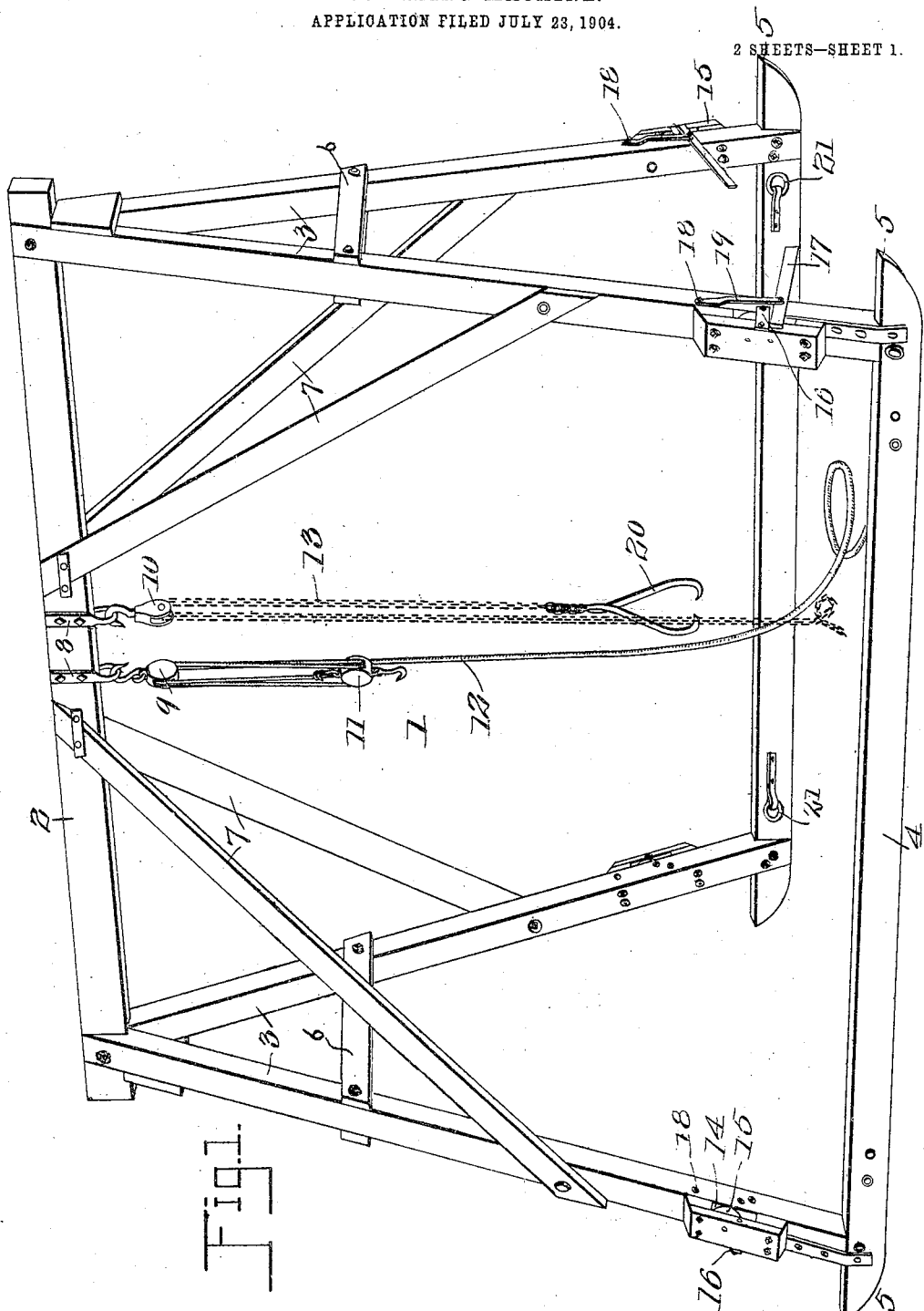

No. 799,926. PATENTED SEPT. 19, 1905.
J. T. McGARRITY.
LOG PILING MACHINE.
APPLICATION FILED JULY 23, 1904.

2 SHEETS—SHEET 1.

Witnesses
Inventor John T. McGarrity
by C. A. Snow & Co.
Attorneys

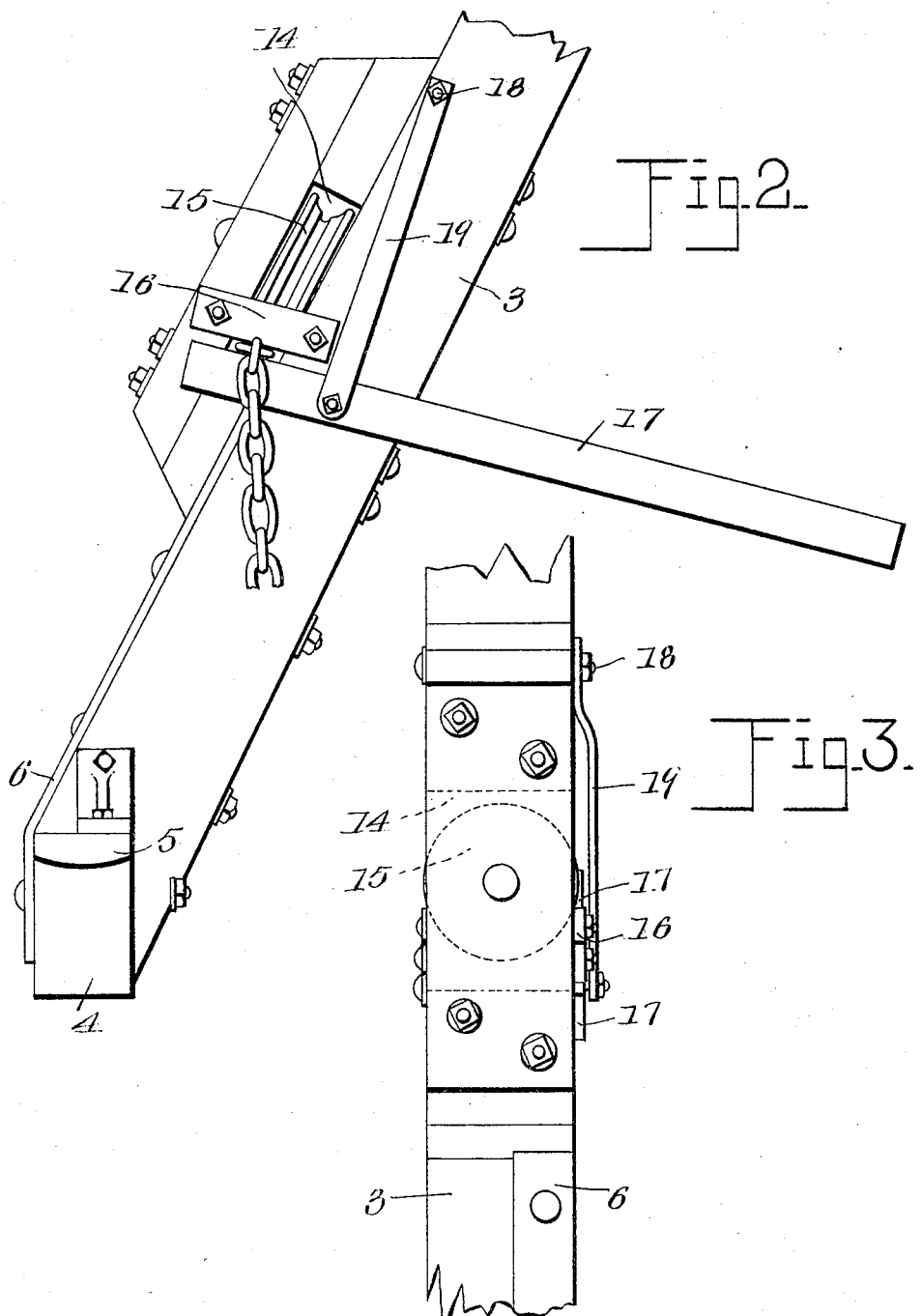

UNITED STATES PATENT OFFICE.

JOHN THOMAS McGARRITY, OF OSCEOLA, ARKANSAS, ASSIGNOR OF TWO-THIRDS TO WALTER W. DRIVER AND ELY E. DRIVER, OF OSCEOLA, ARKANSAS.

LOG-PILING MACHINE.

No. 799,926.      Specification of Letters Patent.      Patented Sept. 19, 1905.

Application filed July 23, 1904. Serial No. 217,853.

*To all whom it may concern:*

Be it known that I, JOHN THOMAS McGARRITY, a citizen of the United States, residing at Osceola, in the county of Mississippi and State of Arkansas, have invented a new and useful Log-Piling Machine, of which the following is a specification.

My invention relates to derricks designed especially for hauling and piling logs during the operation of clearing land, and has for its objects to produce a comparatively simple inexpensive device of this character which will be strong and durable, one which may be readily transported from place to place, and one whereby logs irrespective of their sizes may be readily collected and arranged in neat compact piles.

To these ends the invention comprises the novel features of construction and combination of parts more fully hereinafter described.

In the accompanying drawings, Figure 1 is a perspective view of the improved device complete. Figs. 2 and 3 are detail views, on an enlarged scale, of one of the guide-pulleys and braking mechanisms.

Referring to the drawings, 1 designates as a whole the derrick-frame, which includes an overhead horizontal supporting beam or timber 2, securely bolted at its ends to and sustained by end members or standards 3, preferably in the form of beams or timbers arranged in pairs, as shown, to diverge from their upper meeting ends downwardly and bolted or otherwise secured at their lower ends to horizontal base timbers or runners 4, the terminals of which are upwardly and outwardly beveled or inclined, as at 5, the end members being connected in pairs at a point suitably remote from the ground by transverse connecting-braces 6, while the overhead timber 2 is strengthened and sustained between its ends by means of diagonal braces 7, extending between the same and the end members 3.

Attached to the support 2, adjacent to its longitudinal center and between the upper ends of the diagonal braces, is a pair of spaced hangers 8 in the form of strap-metal clips having depending loops or eyes. From one of the hangers there is suspended by the usual hook a primary sheave pulley or block 9 and from the other a secondary pulley 10, there being threaded through the primary block 9 and its auxiliary sheave-block 11 a hoisting-cable 12, while through the block 10 is threaded a hoisting-chain 13, the purposes of both of which will more fully hereinafter appear.

Each beam 3 is provided adjacent to its lower end with a bearing-opening 14, in which is housed for rotation a groove-pulley 15, over any one of which pulleys either the cable 12 or chain 13 may in practice be passed for travel during the hauling and hoisting operations.

Each standard 3 has mounted thereon at its front end face and in line with the lower end of the pulley-opening 14 a brake comprising a fixed bar or member 16 and a movable bar or member 17, these members being preferably composed of strap-steel and appropriately spaced to permit the passage of the chain or cable between them, as clearly illustrated in Fig. 2, while the braking member or lever 17 is pivoted by means of a bolt 18, extended through the beam 3 and through a strap-metal bearing 19, attached to the beam and lying upon the outer face of the lever.

The device is equipped with three pairs or sets of grappling devices or tongs 20, of which one pair is of comparatively large size, while the two remaining pairs are of medium size, the tongs being adapted in practice for suspension either beneath the auxiliary pulley 11 or at the end of the chain 13.

Attached to the runners 4, adjacent to their ends, are draft-rings 21, to which the draft-rigging of a team may be connected for drawing the derrick over the ground in transporting the same from place to place.

In practice the derrick is moved to the desired point in a field to be cleared, and the chain or cable, as the case may be, is passed around the appropriate pulley 15 and connected with the draft-rigging of the animals. At this point it is to be understood that in handling logs of moderate size it is preferable to employ the single block 10 and chain 13, inasmuch as the apparatus may under these conditions be operated more rapidly, while in handling logs of unusually large size the double sheave-pulleys 9 11 and cable 12 are brought into play. The derrick having been brought to the proper position, the grappling-tongs of the hoisting mechanism which is at the time in use is engaged with a log and the latter is hauled to position beneath the derrick. After the bottom layer or foundation of logs for the contemplated pile has been arranged it then becomes necessary to hoist the remaining logs of the pile and lower them to the proper position upon the latter. A log having been hoisted must be swung to proper position before lowering upon the pile, and in order to relieve the draft-animals of the weight of the log during this operation the movable braking member or lever 17 may be manipulated for tightly clamping the flexible hoisting element, as will be readily understood. It is to be particularly observed that by providing a series of the pulleys 15, one upon each of the frame-standards, the draft-animals may be placed in the most convenient position for hauling logs from any surrounding point to the derrick.

It is apparent from the foregoing that there is produced a strong durable mechanism which may be readily transported over a field and by which the logs to be piled may be collected from all points within quite a large radius around the derrick and accurately and compactly piled by the latter. In attaining these ends it is to be understood that minor changes in the details herein set forth may be resorted to without departing from the spirit of the invention.

Having thus described my invention, what I claim is—

1. In a device of the class described, the combination with supporting-standards, of an overhead support sustained thereby, a pulley carried by one of the standards, a flexible hoisting element connected with the support and designed for travel over the pulley, and a braking member adapted for engagement with the hoisting element.

2. In a device of the class described, the combination with standards, of an overhead support sustained thereby, a fixed and a movable braking member carried by one of the standards, a pulley also carried by said standard, and a flexible hoisting element connected with the support and designed to travel over the pulley and between the braking members.

In testimony that I claim the foregoing as my own I have hereto affixed my signature in the presence of two witnesses.

JOHN THOMAS McGARRITY.

Witnesses:
J. L. STANDLEY,
F. G. GIBSON.